United States Patent

[11] 3,630,096

| [72] | Inventor | Carl T. Brewer |
| | | 1533 S. 7th Street, St. Louis, Mo. 63104 |
| [21] | Appl. No. | 65,786 |
| [22] | Filed | Aug. 21, 1970 |
| [45] | Patented | Dec. 28, 1971 |

[54] DRIVE-TENSIONING APPARATUS
12 Claims, 6 Drawing Figs.
[52] U.S. Cl. ..................................... 74/242.1 A, 74/242.11 A
[51] Int. Cl. ....................................... F16h 7/12
[50] Field of Search ........................... 74/242.1 A, 242.11 A

[56] References Cited
UNITED STATES PATENTS
| 1,575,655 | 3/1926 | Stinson | 74/242.1 A X |
| 1,582,516 | 4/1926 | Gibson | 74/242.1 A UX |
| 2,270,000 | 1/1942 | Danker | 74/242.1 A |

Primary Examiner—Leonard H. Gerin
Attorney—Cohn and Powell

ABSTRACT: This drive-tensioning apparatus includes a base and a floating arm slidably mounted to the base. Rotatable idler elements are mounted at each end of the arm and each rotatable element is engageable with an outer face of the flexible drive element. The idler elements are spaced apart a distance less than the transverse distance between opposed taut and slack portions of a continuous drive element so that the slack portion of said element is tensioned by one or the other of said idler elements, depending on the direction of the drive and the floating arm is automatically relocated when the drive is reversed. The spacing between idler elements may be adjusted to suit specific drive systems. The arm is noncircular in section and the base includes a compatible aperture receiving the arm to permit vertical reciprocation of the arm but preclude axial rotation of the arm relative to the base.

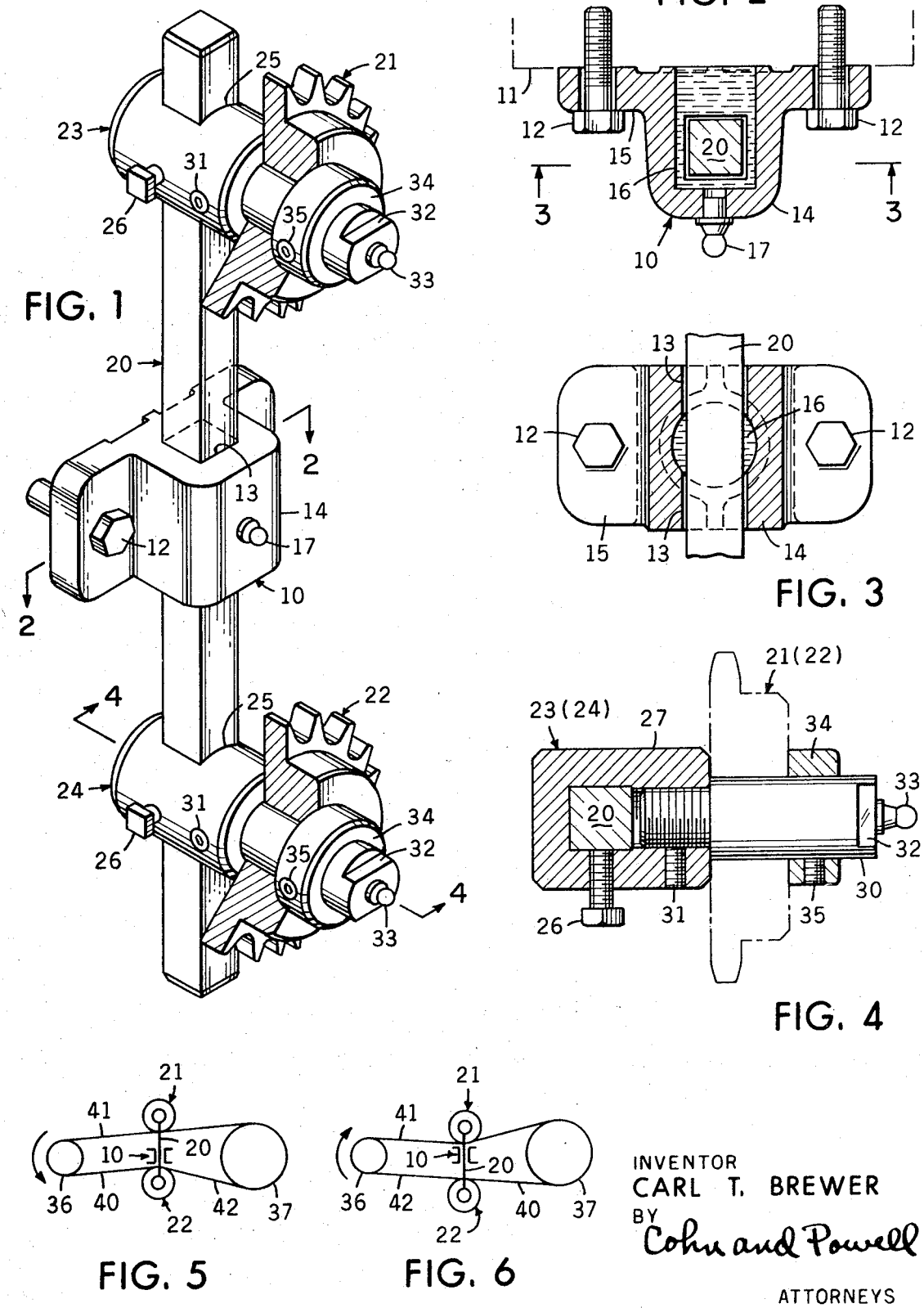

3,630,096

DRIVE-TENSIONING APPARATUS

BACKGROUND OF THE INVENTION

This invention relates generally to a drive-tensioning apparatus and more particularly to an improved automatically adjustable tensioner for use with chain and belt drives.

Drive efficiency in both chain and sprocket and in belt and pulley systems is related to the tension in the flexible drive element. The operation of such elements in a slack condition is a principal cause of power loss which has led to the use of various tensioning devices. Although tensioning of the flexible elements, when judiciously applied, undoubtedly assists in reducing power loss, excessive tensioning produced undesirable side effects. For example, excessive tensioning stretches and rapidly deteriorates the flexible drive element. Further, optimum tensioning varies with the load conditions and consequently, a tensioning device should be adjustable to accommodate changes in the load, at least within a practical operating range for a given drive system.

A reversible drive feature is particularly desirable in many flexible drive systems. However, when the direction of a drive element is reversed, the taut and slack portions of the flexible drive element are also reversed. Tensioning idlers preferably engage the slack portion and the consequence of reversal, is that unless the tensioning device is relocated, the new taut portion experiences greater tension than the old and the new slack portion experiences greater slackness.

It is possible to overcome this problem to some extent by providing a pair of tensioning idlers which may be swung in and out of engagement with the slack portion of the flexible drive element as that portion is relocated due to reversal of the drive. However, this solution has the obvious disadvantage that manual adjustment must be made everytime the operator wishes to reverse the machine.

SUMMARY OF THE INVENTION

This drive-tensioning apparatus utilizes a floating mount system which permits a straight-line pull between driver and driven elements independently of drive direction, and yet maintains initial tension preset for the drive.

The apparatus does not require a dual system of idler tensioners which must be manually swung into and out of engagement each time the drive is reversed in order to maintain correct tension.

It is unnecessary with this apparatus, to accept increased tension and slackness which results when a fixed axis idler is located on the wrong side of the belt following drive reversal. Floating action allows the floating apparatus to accommodate a change in drive geometry when the drive direction is reversed.

The drive-tensioning apparatus includes a base means and support means carrying a pair of spaced rotatable elements, said support means being mounted to the base means for reciprocating motion of said rotatable elements relative to the base means. One of said rotatable elements is engageable with a first portion of the flexible drive element in one location when said first portion moves in one direction, and in a different location when said first portion moves in the opposite direction. The other of said rotative elements is engageable with a second portion of the drive element in one location when said second portion moves in one direction, and in a different location when said second portion moves in a reverse direction.

The base means includes guide means and the support means includes an arm slidably received by the guide means in nonrotatable relation. The arm is elongate and has a noncircular cross section and the guide means includes a compatible noncircular aperture receiving said arm.

The support means includes a pair of transverse shafts mounting the rotatable elements and at least one of said shafts is movably mounted to the arm to selectively adjust the spacing between said rotatable elements. The shafts are provided by transversely apertured trunnions and the apertures are compatibly configured with the arm to preclude axial movement of the arm relative to said trunnions.

The trunnions are spaced apart so that the clear distance between engaging faces of the rotatable elements is less than the distance across the outer faces of the flexible drive elements in the freely moving position.

BRIEF DESCRIPTION OF THE DRAWING

FIG. 1 is a perspective view of the apparatus;
FIG. 2 is a cross-sectional view taken on line 2—2 of FIG. 1;
FIG. 3 is a cross-sectional view taken on line 3—3 of FIG. 2;
FIG. 4 is a cross-sectional view taken on line 4—4 of FIG. 1;
FIG. 5 is a diagrammatic representation of the disposition of the apparatus with the flexible drive system operating in one direction; and
FIG. 6 is a diagrammatic representation of the apparatus with the flexible drive system operating in the opposite direction.

DESCRIPTION OF THE PREFERRED EMBODIMENT

The drive-tensioning apparatus described herein is adapted for use with a chain and sprocket drive system. However, it will be understood that the apparatus is equally adaptable for use with a belt and pulley system.

Referring now by characters of reference to the drawing and first to FIG. 1, it can be seen that the tensioning apparatus includes a guide bracket 10 constituting a base means which is intended to be mounted to a wall plate 11, or a part of a machine or other general base. The bracket 10 is securely clamped to the wall plate 11 by means of a pair of fasteners, such as bolts 12. In the preferred embodiment, the bracket 10 is substantially T-shaped to include a stem portion 14 and a head portion 15 and said bracket 10 includes a guide aperture 13 constituting a guide means, passing through the stem portion 14. The bracket 10 is substantially hollow to provide an open-ended lubricating chamber 16 which is closed by the wall plate 11 when the bracket 10 is attached thereto. The lubricating chamber 16 is in communication with the guide aperture 13 and a grease nipple 17 provides a means of charging the lubricating chamber 16 with lubricant.

An elongate arm 20, constituting a support means, is received by the guide aperture 13 in sliding relation incident to reciprocation of said arm in operation. The aperture 13 constitutes a guide means for the arm 20 and is compatibly configured with the arm 20 to preclude axial rotation thereof. To this end, the arm 20 and aperture 13 are noncircular and, in the preferred embodiment, are square.

Upper and lower idler sprockets 21 and 22, constituting first and second rotatable elements respectively, are mounted at opposed ends of the elongate arm 20. The sprockets 21 and 22 are mounted to the arm 20 in spaced relation from each other by trunnions 23 and 24 constituting shaft means. The trunnions 23 and 24 are substantially identical and interchangeable in the preferred embodiment. For this reason, like reference numbers are used to indicate corresponding parts in each of the trunnions 23 and 24. Each of the trunnions 23 and 24 includes a square aperture 25 compatibly configured to receive the square elongate arm 20 and the trunnions are adjustably mounted in clamped relation to said arm 20 by means of a setscrew 26 which engages an associated face of said arm 20 as shown in FIG. 4. Further, each of the trunnions 23 and 24 includes a reduced portion providing a stub axle 30 which is threadedly received within a body portion 27 and locked in place by means of a setscrew 31. Wrench flats 32 are provided at the remote end of the stub axle 30 and a grease nipple 33 provides a means of lubricating the journal bearing. The trunnions 23 and 24 each include a retaining collar 34 which is held in place on the stub axle 30 by means of a setscrew 35, to retain the sprockets.

The drive tensioning apparatus is set up substantially as indicated schematically in FIGS. 5 and 6, in which it is indicated as being used in conjunction with a drive system including a drive element 36, a driven element 37 and an endless flexible drive element 40. It will be understood that in this drive system, the upper and lower portions 41 and 42 of the drive element 40 constitute first and second portions which are substantially horizontal and that the elongate arm 20 is disposed substantially vertically in transverse relation to said portions 41 and 42 for freely floating reciprocating motion under forward and reverse drive conditions as indicated by the arrows in FIGS. 5 and 6 respectively. In the forward drive condition indicated in FIG. 5, the upper portion 41 is under tension and the lower portion 42, normally slack, is relatively tensioned by the lower idler 22. This tensioning of the lower portion 42 is accomplished by providing a spacing between the upper and lower idlers 21 and 22 which is sufficiently small to draw the two drive element portions 41 and 42 together. When the drive direction is reversed, as shown in FIG. 6, the lower drive element portion 42 is under tension and the upper portion 41, normally slack, is relatively tensioned by the upper idler 21.

It is thought that the structural features and functional advantages of this drive-tensioning apparatus have become fully apparent from the foregoing description of parts, but for completeness of disclosure, the installation and operation of the device will be briefly described.

The guide bracket 10 is attached to a flat face such as a wall plate 11, and the bolts 12 tightened to draw the machined boss 18 into close contact with said plate 11. The open end of the lubricating chamber 16 is thereby closed. The elongate arm 20 is installed within the compatible bracket guide aperture 13 which is sufficiently oversize to permit said arm 20 to reciprocate freely relative to the guide bracket 10. Each of the trunnions 23 and 24 is mounted to an associated end of the arm 20 and positioned longitudinally on the arm by means of setscrews 26. It will be understood that when thus installed, the combined arm and idler sprocket assembly is disposed adjacent to a flexible chain drive element 40 and that each of the sprockets 21 and 22 is outwardly disposed of an associated chain portion 41 and 42. The chain element 40 is capable of traveling at different speeds and in different directions during different drive conditions.

The oppositely disposed chain portions 41 and 42 are spaced apart a specific distance when the drive is operative under a known load condition but without tensioners, and by drawing the sprockets 21 and 22 together, the associated chain portions 41 and 42 are also drawn together and a requisite amount of tension may be induced into the flexible drive element 40 sufficient to insure that a substantially straight-line pull exists between the drive and driven elements 36 and 37, regardless of the drive direction and without loss of initial tension preset for the drive.

When a drive system, such as that indicated in FIGS. 5 and 6, is operating freely without being subjected to forces from a tensioning apparatus, one of the chain portions is taut and the other relatively slack. For example, in FIG. 5, under free drive conditions, without tensioners, in which the drive sprocket 36 is rotated counterclockwise, the upper chain portion 41 is taut and the lower chain portion 42 is relatively slack. By drawing the two tensioning sprockets 21 and 22 together, the slackness in the lower chain portion 42 is overcome. The tension in the upper chain portion 41 tends to exert an upward force on the upper sprocket 21, and hence on the arm and sprocket assembly as a whole, with the result that the lower sprocket 22 exerts a tensioning pressure on the lower chain portion 42. When the drive is reversed, as shown in FIG. 6, the lower chain portion 42 becomes taut and the upper chain portion 41 tends to become slack. However, the tension in the lower chain portion 42 tends to exert a downward force on the sprocket and arm assembly as a whole with the result that the upper sprocket 21 exerts a tensioning pressure on the upper chain portion 41. Because of the manner in which the arm 20 is mounted to the bracket 10, the sprocket and arm assembly is easily able to accommodate, by reciprocating floating action, not only complete reversal of the drive systems but also variations in chain tension, which occur because of load and speed variations, over a fairly wide range. Floating action allows the tensioning apparatus to accommodate automatically to change in the drive geometry when the direction is reversed as shown in FIGS. 5 and 6. The only load on the idler sprockets is the initial static load plus a small dynamic load from the rolling friction of the idler sprocket bearing. The disadvantages of a fixed idler initially engaging the slack side of the drive element and engaging the taut side when the drive is reversed, thereby carrying a component of the belt load on the fixed position idler because said idler is on the wrong side, is avoided.

The sprockets 21 and 22 are offset from the arm 20 and there is therefore an eccentric load applied to the arm 20 by the trunnions 23 and 24 tending to twist said arm 20 about its own axis. This twisting load is resisted by the provision of square apertures 25 in the trunnions 23 and 24 and the square guide aperture 13 in the bracket 10.

It will be understood that although lineal reciprocation is experienced by the arm support means in the preferred embodiment, the term reciprocation is also intended to embrace arcuate reciprocation or oscillation or any similar motion which accomplishes the floating capability of the rotatable element relative to the guide bracket.

I claim as my invention:

1. A drive-tensioning apparatus for a continuous, flexible drive element comprising:
   a. base means,
   b. support means mounted to the base means,
   c. a first element rotatively mounted to the support means in reciprocating relation to the base means and engageable with a first portion of the flexible drive element in one location when said portion moves under one drive condition and engageable with said portion in a different location when said portion moves under a different drive condition, and
   d. the second element disposed in spaced relation from the first element and rotatively mounted to the support means in reciprocating relation to the base means and engageable with a second portion of the flexible drive element in one location when said portion moves under one drive condition and engageable with said portion in a different location when said portion moves under a different drive condition.

2. A drive-tensioning apparatus as defined in claim 1, in which:
   e. the support means includes an arm adjustably mounting the first element relative to the second element.

3. A drive-tensioning apparatus for a continuous, reversible flexible drive element comprising:
   a. base means,
   b. support means mounted in reciprocating relation to the base means,
   c. a first element rotatively mounted to the support means and engageable with the first portion of the flexible drive element a spaced distance from the base means when said first portion moves in one direction and engageable with the first portion a different spaced distance from the base means when said first portion moves in the reverse direction, and
   d. a second element disposed in spaced relation from the first element and rotatively mounted to the support means and engageable with a second portion of the flexible drive element a spaced distance from the base means when said second portion moves in one direction and engageable with said second portion a different spaced distance from the base means when said second portion moves in the opposite direction.

4. A drive-tensioning apparatus as defined in claim 3, in which:
   e. the base means includes guide means, and
   f. the support means includes an arm slidably received by the guide means.

5. A drive-tensioning apparatus as defined in claim 3, in which:

e. the base means includes a guide aperture, and f. the support means includes an arm having a section compatible with the guide aperture and being slidably received by said aperture.

6. A drive tensioning apparatus as defined in claim 3, in which:

e. the base means includes a noncircular guide aperture, and f. the support means includes an arm having a section compatible with said guide aperture to preclude rotation of said arm about its own longitudinal axis.

7. A drive-tensioning apparatus as defined in claim 3, in which:

e. the support means includes an arm and a pair of transverse shafts mounting the first and second rotative elements, and f. at least one of said shafts is movably mounted to the arm to selectively adjust the spacing between said rotative elements.

8. A drive-tensioning apparatus as defined in claim 7, in which:

g. the transverse shafts are provided by trunnions mounted to the arm outwardly of the flexible drive element whereby each rotative element engages an associated outer face of said flexible drive element.

9. A drive-tensioning apparatus as defined in claim 8, in which:

h. both trunnions are movable mounted to the arm to selectively adjust the spacing between the rotative elements.

10. A drive-tensioning apparatus as defined in claim 3, in which:

e. the base means includes a guide aperture, f. the support means includes;

1. an elongate arm adapted to be disposed transversely of the flexible drive element and slidably received in guided relation within said guide aperture, and 2. a pair of trunnions movably mounted to the arm for selective adjustment relative thereto, each trunnion rotatively mounting one of each trunnion rotatively mounting one of said rotative elements to engage an associated outer face of the flexible drive element.

11. A drive-tensioning apparatus as defined in claim 10, in which:

g. the elongate arm is provided with a noncircular section, and h. each trunnion includes a compatible, noncircular aperture receiving said arm, and each trunnion includes clamping means selectively fixing each trunnion to said arm.

12. The method of tensioning a reversible flexible drive element comprising the steps of:

a. holding a pair of rotative elements in spaced relation from each other, b. disposing each of said elements in adjacent engageable relation with oppositely facing and oppositely moving portions of a flexible drive element whereby the intersection line between said elements is transversely disposed of said portions, c. adjusting the spacing between said rotative elements until the clear spacing between the engaging faces of said elements is less than the distance across the engageable flexible drive element faces in the freely moving position, d. fixing said spacing of said rotative elements, and e. releasing said rotative elements for freely floating reciprocating transverse movement under variable speed and directional conditions of the flexible drive element.

* * * * *